Nov. 19, 1963   G. L. M. GÖTZ   3,111,117
AIR-COMPRESSING, SELF-IGNITING, PRE-COMBUSTION CHAMBER
INJECTION TYPE, INTERNAL-COMBUSTION ENGINE
Filed Oct. 30, 1962   2 Sheets-Sheet 1
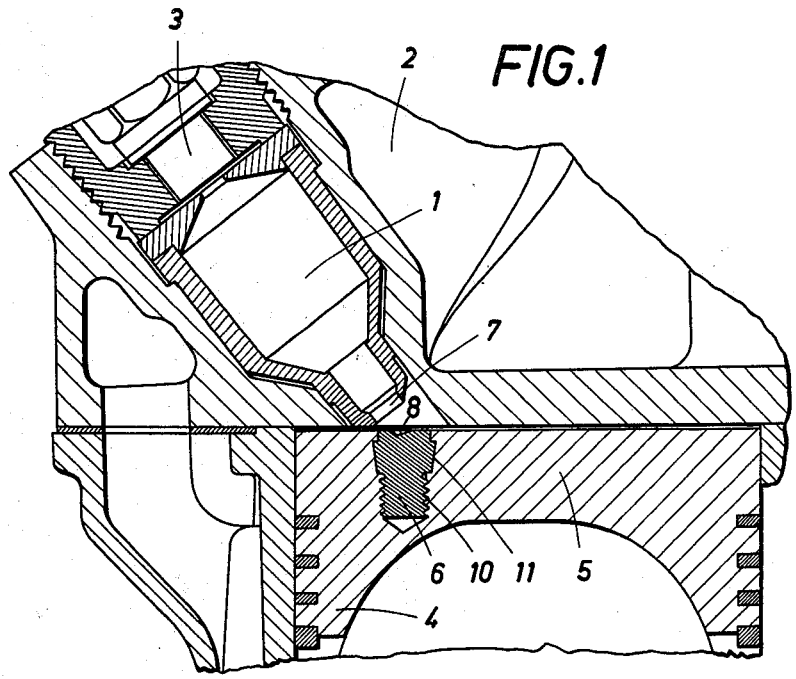
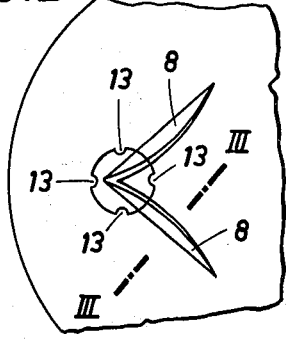
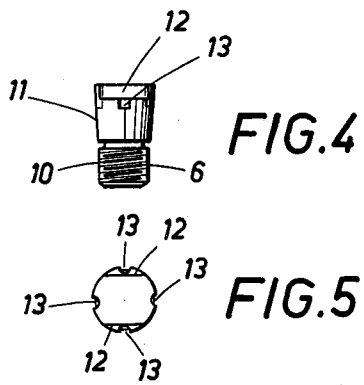
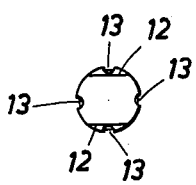
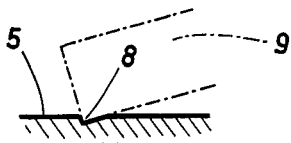
INVENTOR.
GERHARD GOTZ
By Kurt Kelman
agent 3,111,117
AIR-COMPRESSING, SELF-IGNITING, PRE-COM-
BUSTION CHAMBER INJECTION TYPE, IN-
TERNAL-COMBUSTION ENGINE
Gerhard Leo Max Götz, Steyr, Austria, assignor to Steyr-
Daimler-Puch Aktiengesellschaft, Steyr, Austria
Filed Oct. 30, 1962, Ser. No. 234,195
Claims priority, application Austria Nov. 6, 1961
2 Claims. (Cl. 123—32)

This invention relates to an air-compressing, self-igniting pre-combustion chamber injection type, internal-combustion engine, the piston of which has a head, which is provided with a substantially flat or slightly curved end face and, at the point where the fuel jet emerging from the pre-combustion chamber impinges, an insert of high temperature-resisting material. Such inserts have previously been used in the piston head to protect the area where the jet flame coming from the pre-combustion chamber impinges on the piston and to distribute the generated heat as quickly and uniformly throughout the piston head. Hence, it is desired to provide for a good heat transfer from the insert to the surrounding piston material. For this purpose it has already been proposed to fill the insert, consisting of a hollow body, with a heat transfer medium consisting of metal or the like which is liquid at the operating temperature. The same function is served by so-called piston protecting plates, which extend throughout the end face of the piston.

The precombustion chamber has previously been dimensioned, as a rule, to have a volume of about 50% of the entire clearance volume. This will be particularly the case if the piston head has a depression for combustion and/or valve pockets. This feature serves also to avoid a local overheating of the piston head because with relatively small pre-combustion chambers the emerging jet flame has a smaller heat content and a uniform combustion takes place throughout the combustion chamber. Whereas a formation of cracks in the piston as a result of heat stresses due to temperature differences is thus avoided, it has been found that a reduced temperature of the piston head will increase the ignition lag. A delayed ignition, however, will permit of an accumulation of a larger amount of unburnt fuel in the meantime, so that a steep increase in combustion pressure and loud combustion noise result.

As contrasted therewith, it is an object of the invention to provide an ignition type, internal-combustion engine which distinguishes by low-noise operation and is not liable to form cracks in the piston.

The pre-combustion chamber ignition type, internal-combustion engine according to the invention is essentially characterized in that the ratio of the diameter of the overflow opening of the pre-combustion chamber to the diameter of the substantially cylindrical insert is 1:1 to 1:2 and the pre-combustion chamber constitutes suitably more than 65% of the clearance volume. The size of the insert is sufficient to protect the point where the fuel jet impinges on the piston head and which ensures such a storage of heat in the insert that the same has a temperature difference of about 40–50° C. relative to the surrounding piston material. During the compression stroke, the displaced air is compelled to flow in contact with the insert so that it reaches the interior of the pre-combustion chamber after having been additionally preheated. Owing to the large volume of the pre-combustion chamber, this displaced air constitutes a major part of the total air. Because the pre-combustion chamber takes up a much larger portion of the air than before, the inflow rate through the overflow opening is relatively high even at low speeds of the engine so that the injected fuel jet is thoroughly torn apart, swirled, and virtually prevented from leaving the pre-combustion chamber. Hence, almost the entire combustion process takes place in the pre-combustion chamber and there is virtually no ignition delay owing to the efficient preheating of the air and the fine distribution of the fuel. This results in a smooth, low-noise combustion. Tests have shown that depressions or pockets in the piston head or corresponding recesses in the cylinder head increase the combustion noise, apparently because rests of unburnt fuel can accumulate in these recesses of the main combustion chamber and when burnt causes a sudden rise in pressure. Besides, such additional cavities have an adverse effect on the volume ratio of pre-combustion chamber and main combustion chamber. In light-alloy pistons, the insert may consist of very high temperature-resisting steel, which has a relatively small coefficient of thermal conductivity compared to light alloys so that the desired temperature difference can be obtained.

In a development of the invention, the piston head is formed with grooves which radiate from the central area of the insert. These grooves ensure a uniform distribution of the jet flame emerging from the overflow opening almost throughout the end face of the piston so that a favorable heat distribution over the piston head results and an excessive heating of the valve-carrying portion of the cylinder head is avoided. The grooves may be formed, e.g., with the aid of a milling cutter having an axis which is inclined relative to the piston axis, after the insert has been fitted, and have suitable an approximately V-shaped cross-section.

According to the invention the insert has a screw thread extending only over a part of its length and continued by a slender cone. This screw thread is in threaded engagement with the piston head, in which the insert is locked by calking. The cone of the insert is in snug engagement with the material of the piston head. By an appropriate selection of the ratio of the length of the cone to the length of the screw thread, the heat transfer between the two materials can be controlled. Besides, the combination of a cone and a threaded part results in a better grip of the insert in the piston head. The insert is screwed in cold condition into the piston when the latter is approximately at operating temperature so that a subsequent loosening owing to differential thermal expansion is avoided. To safely lock the insert against rotation, it is suitably provided during assembly with a plurality of longitudinal grooves on its periphery so that the piston material may flow into these grooves during the calking operation.

A particularly desirable design is achieved if the female thread in the piston head has an inside diameter which corresponds to the outside diameter of the thread of the insert and a cylindrical helical spring is threaded into the female thread, in a manner known per se, to form the female threads for the insert. In this case the screw threads of the insert do not directly interengage with the piston head but the insert is held by the spring, which is screwed into the piston head. As a result, the heat transfer from the insert to the piston head material adjacent to the threads is further reduced so that the desired retention of heat in the insert will be obtained in any case. As the helical spring consists of high-grade steel and owing to its resiliency is in snug contact with all convolutions of the female thread, there is no danger of damage to the thread during assembly. The resiliency of the spring will also cause a compensation of differential thermal expansion or contraction of the piston head and the insert so that a loosening of the insert will be reliably avoided even after a long period of operation.

In the drawing, the invention is illustrated by way of example.

FIG. 1 is an axial sectional view showing a portion of a cylinder, piston and cylinder head of a pre-combustion chamber injection type, internal-combustion engine.

FIG. 2 is an end view showing the piston.

FIG. 3 is a fragmentary sectional view taken on line III—III of FIG. 2 and showing a portion of the piston head.

Figure 6:
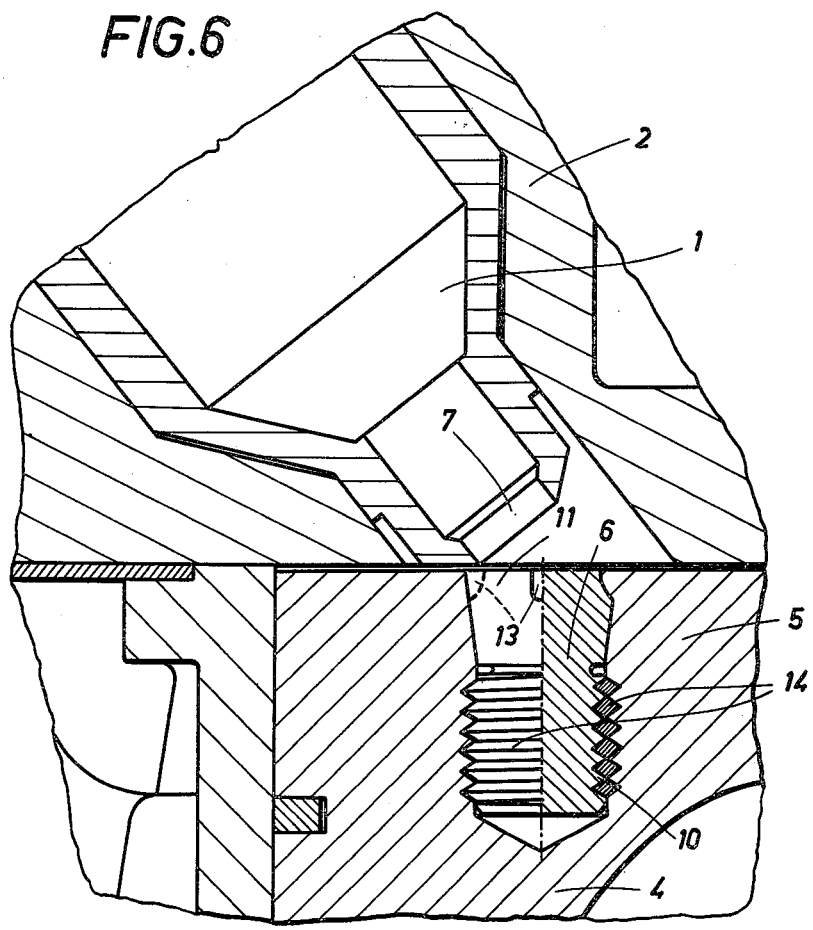

FIGS. 4 and 5, respectively, are an elevation and a top plan view showing the insert.

FIG. 6 is an enlarged view showing a modification of the fixation of the insert in the piston head.

The fuel is coaxially injected through an injection nozzle 3 into the pre-combustion chamber 1 provided in the cylinder head 2. The arrangement is such that the distance of the piston 4 at its upper dead center from the underside of the cylinder head corresponds only to the thickness of the cylinder head gasket. As a result, the pre-combustion chamber constitutes more than 65% of the entire clearance volume. A substantially cylindrical insert 6 of high temperature-resisting material is provided in the piston head 5 at the point where the jet flame emerging from the pre-combustion chamber impinges thereon. The piston head 5 has a flat end face. The ratio of the diameter of the overflow opening 7 of the pre-combustion chamber to the diameter of the insert 6 is about 1:1.5. By means of a milling cutter 9 (FIG. 3), the piston head 5 is formed with grooves 8, which radiate from the center of the insert 6.

As is apparent from FIGS. 4 and 5, the insert 6 has a screw thread 10, which extends only over a part of the length of the insert and is continued by a slender cone 11. The insert 6 is longer than the bore formed in the piston head to receive the insert. The protruding portion of the insert is formed with flats 12, to which a wrench can be applied for screwing the insert. The insert is provided on its periphery with a plurality of longitudinal grooves 13. When the insert 6 has been screwed in and firmly tightened, the material of the piston head is calked adjacent to the longitudinal grooves to hold the insert against rotation. The end portion protruding over the end face of the piston head is then removed. This is followed by milling the grooves 8.

According to FIG. 6, the inside diameter of the female screw thread in the piston head 5 corresponds to the outside diameter of the screw thread 10 of the insert. A cylindrical helical spring 14 is screwed into this female thread. This spring has a rhombic cross-section and forms the female screw threads for the insert 6. To facilitate the introduction of the helical spring, the lower end thereof is radially inwardly angled so that the spring can be screwed with the aid of an inserted pin, which has at its end face a transverse slot for receiving the inwardly angled end portion of the spring. The angled end portion of the spring is knocked off and removed from the bore when the spring has been screwed in.

What is claimed is:

1. An air-compressing, self-igniting, pre-combustion chamber ignition type, internal-combustion engine, which comprises a cylinder structure defining a combustion chamber, a pre-combustion chamber, and an orifice disposed at one end of said combustion chamber and affording communication between said combustion chamber and said pre-combustion chamber and adapted to direct a jet flame from said pre-combustion chamber into said combustion chamber along a predetermined path, said engine further comprising a piston movable in said combustion chamber to an upper dead center position in which it is relatively close to said end of said combustion chamber formed with said orifice, said piston having a substantially flat head facing said orifice and provided with a substantially cylindrical insert of high temperature-resisting material arranged to be impinged by said jet flame, the ratio of the diameter of said orifice to the diameter of said insert at its end facing said orifice being 1:1 to 1:2 and the volume of said pre-combustion chamber being at least 65% of the total volume of said pre-combustion chamber and that portion of said combustion chamber which is disposed between said piston and said one end of said combustion chamber when said piston is in said upper dead center position said piston being formed on its side facing said one end of said combustion chamber with grooves which radiate from the central area of the insert.

2. An air-compressing, self-igniting, pre-combustion chamber ignition type, internal-combustion engine, which comprises a cylinder structure defining a combustion chamber, a pre-combustion chamber, and an orifice disposed at one end of said combustion chamber and affording communication between said combustion chamber and said pre-combustion chamber and adapted to direct a jet flame from said pre-combustion chamber into said combustion chamber along a predetermined path, said engine further comprising a piston movable in said combustion chamber to an upper dead center position in which it is relatively close to said end of said combustion chamber formed with said orifice, said piston having a substantially flat head facing said orifice and provided with a substantially cylindrical insert of high temperature resisting material arranged to be impinged by said jet flame, the ratio of the diameter of said orifice to the diameter of said insert at its end facing said orifice being 1:1 to 1:2 and the volume of said pre-combustion chamber being at least 65% of the total volume of said pre-combustion chamber and that portion of said combustion chamber which is disposed between said piston and said one end of said combustion chamber when said piston is in said upper dead center position, said piston head being formed with a female screw thread and said insert having a screw thread extending only over a part of its length and effectively in threaded engagement with said female screw thread, said insert having a slender cone portion beyond the end of said screw thread opposite to said orifice, said piston head having calked portions locking said insert in position, said female thread having an inside diameter corresponding to the outside diameter of said screw thread of said insert, and a cylindrical helical spring interposed between and in threaded engagement with said female screw thread and said screw thread of said insert.

References Cited in the file of this patent
UNITED STATES PATENTS 3,035,559 Brandes et al. _____ May 22, 1962

FOREIGN PATENTS 898,093 Germany _____ Nov. 26, 1953
941,525 Germany _____ Apr. 12, 1956